US008582173B2

(12) United States Patent
Kise (10) Patent No.: US 8,582,173 B2
(45) Date of Patent: Nov. 12, 2013

(54) COLOR PROCESSING APPARATUS AND METHOD (75) Inventor: Takashi Kise, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 885 days.

(21) Appl. No.: 12/117,553

(22) Filed: May 8, 2008

(65) Prior Publication Data
US 2009/0051973 A1    Feb. 26, 2009

(30) Foreign Application Priority Data

May 10, 2007 (JP) ................................ 2007-125244

(51) Int. Cl.
*H04N 1/40* (2006.01)
(52) U.S. Cl.
USPC ........... 358/1.9; 358/3.23; 358/504; 358/518; 358/523; 358/525
(58) Field of Classification Search
USPC ............... 358/1.9, 3.23, 3.03, 535, 504, 518, 358/523, 525
See application file for complete search history.

(56) References Cited

U.S. PATENT DOCUMENTS

| 5,289,383 | A | * | 2/1994 | Sawamura et al. | ........... 700/187 |
| 5,321,797 | A |   | 6/1994 | Morton |   |
| 5,600,764 | A | * | 2/1997 | Kakutani | ....................... 345/591 |
| 7,034,844 | B2 |  | 4/2006 | Akiyama et al. |   |
| 7,944,584 | B2 | * | 5/2011 | Hagai et al. | ..................... 358/1.9 |
| 2001/0043376 | A1 | * | 11/2001 | Kumada et al. | ................ 358/504 |
| 2002/0154326 | A1 | * | 10/2002 | Tsuchiya et al. | ................ 358/1.9 |
| 2003/0067616 | A1 | * | 4/2003 | Toyoda et al. | ................. 358/1.9 |
| 2004/0090534 | A1 | * | 5/2004 | Nakami et al. | ............. 348/220.1 |
| 2004/0212817 | A1 | * | 10/2004 | Hagai et al. | ..................... 358/1.9 |
| 2005/0219586 | A1 | * | 10/2005 | Suzuki et al. | ................... 358/1.9 |
| 2006/0022996 | A1 | * | 2/2006 | Kondo et al. | .................. 345/604 |
| 2006/0023234 | A1 | * | 2/2006 | Kondo et al. | ................... 358/1.9 |
| 2006/0028665 | A1 | * | 2/2006 | Kawai | ............................. 358/1.9 |
| 2007/0230775 | A1 | * | 10/2007 | Ariga et al. | .................... 382/162 |
| 2007/0279657 | A1 | * | 12/2007 | Kishimoto et al. | ............ 358/1.9 |
| 2009/0051973 | A1 | * | 2/2009 | Kise | ............................ 358/3.23 |

FOREIGN PATENT DOCUMENTS

| EP | 706287 A2 | 4/1996 |
| EP | 1367816 A2 | 12/2003 |
| JP | 2006-093915 A | 4/2006 |

* cited by examiner

*Primary Examiner* — Allen H Nguyen
(74) *Attorney, Agent, or Firm* — Canon U.S.A., Inc., IP Division (57) ABSTRACT A color processing apparatus includes an input range obtaining unit configured to obtain an input range of input color data represented by a first color space that is an extended color space, a setting unit configured to set grid point coordinate values for each of a plurality of color components included in the input color data, and a generating unit configured to generate a look-up table by performing conversion processing on each of look-up-table coordinate values corresponding to grid point coordinate values set for the plurality of color components, and storing a result of the conversion processing in the look-up table. The setting unit sets the grid point coordinate values such that each of the primary colors in a second color space that is a base color space is located at a grid point and the color components have the identical grid point coordinate values among the primary colors.

11 Claims, 13 Drawing Sheets

| No. | R | G | B |
|---|---|---|---|
| 0 | -0.5000 | -0.5000 | -0.5000 |
| 1 | 0.5000 | 0.5000 | 0.5000 |
| 2 | 1.5000 | 1.5000 | 1.5000 |
| 3 | 2.5000 | 2.5000 | 2.5000 |
| 4 | 3.5000 | 3.5000 | 3.5000 |
| 5 | 4.5000 | 4.5000 | 4.5000 |
| 6 | 5.5000 | 5.5000 | 5.5000 |
| 7 | 6.5000 | 6.5000 | 6.5000 |
| 8 | 7.5000 | 7.5000 | 7.5000 |

FIG.6
PRIOR ART

| No. | R | G | B |
|---|---|---|---|
| 0 | -0.4837 | -0.0656 | -0.0997 |
| 1 | -0.2506 | 0.0678 | 0.0407 |
| 2 | -0.0175 | 0.2011 | 0.1811 |
| 3 | 0.2156 | 0.3344 | 0.3215 |
| 4 | 0.4487 | 0.4678 | 0.4619 |
| 5 | 0.6818 | 0.6011 | 0.6023 |
| 6 | 0.9150 | 0.7344 | 0.7427 |
| 7 | 1.1481 | 0.8678 | 0.8831 |
| 8 | 1.3812 | 1.0011 | 1.0235 |

| No. | R | G | B |
|---|---|---|---|
| 0 | -0.4837 | -0.0656 | -0.0997 |
| 1 | -0.1053 | -0.0143 | -0.0217 |
| 2 | 0.0000 | 0.0000 | 0.0000 |
| 3 | 0.0474 | 0.0474 | 0.0474 |
| 4 | 0.2176 | 0.2176 | 0.2176 |
| 5 | 0.5310 | 0.5310 | 0.5310 |
| 6 | 1.0000 | 1.0000 | 1.0000 |
| 7 | 1.1906 | 1.0006 | 1.0117 |
| 8 | 1.3812 | 1.0011 | 1.0235 |

| No. | R | G | B |
|---|---|---|---|
| 0 | -0.4837 | -0.0656 | -0.0997 |
| 1 | -0.2569 | -0.0348 | -0.0530 |
| 2 | -0.1053 | -0.0143 | -0.0217 |
| 3 | -0.0229 | -0.0031 | -0.0047 |
| 4 | 0.0000 | 0.0000 | 0.0000 |
| 5 | 0.0103 | 0.0103 | 0.0103 |
| 6 | 0.0474 | 0.0474 | 0.0474 |
| 7 | 0.1156 | 0.1156 | 0.1156 |
| 8 | 0.2176 | 0.2176 | 0.2176 |
| 9 | 0.3556 | 0.3556 | 0.3556 |
| 10 | 0.5310 | 0.5310 | 0.5310 |
| 11 | 0.7454 | 0.7454 | 0.7454 |
| 12 | 1.0000 | 1.0000 | 1.0000 |
| 13 | 1.0953 | 1.0003 | 1.0059 |
| 14 | 1.1906 | 1.0006 | 1.0117 |
| 15 | 1.2859 | 1.0008 | 1.0176 |
| 16 | 1.3812 | 1.0011 | 1.0235 |

FIG.12

| No. | R | G | B |
|---|---|---|---|
| 0 | -0.4837 | -0.0656 | -0.0997 |
| 1 | -0.2569 | -0.0348 | -0.0530 |
| 2 | -0.1053 | -0.0143 | -0.0217 |
| 3 | -0.0229 | -0.0031 | -0.0047 |
| 4 | 0.0000 | 0.0000 | 0.0000 |
| 5 | 0.0063 | 0.0063 | 0.0063 |
| 6 | 0.0290 | 0.0290 | 0.0290 |
| 7 | 0.0707 | 0.0707 | 0.0707 |
| 8 | 0.1332 | 0.1332 | 0.1332 |
| 9 | 0.2176 | 0.2176 | 0.2176 |
| 10 | 0.3250 | 0.3250 | 0.3250 |
| 11 | 0.4563 | 0.4563 | 0.4563 |
| 12 | 0.6121 | 0.6121 | 0.6121 |
| 13 | 0.7931 | 0.7931 | 0.7931 |
| 14 | 1.0000 | 1.0000 | 1.0000 |
| 15 | 1.1906 | 1.0006 | 1.0117 |
| 16 | 1.3812 | 1.0011 | 1.0235 |

FIG.13

| No. | R | G | B |
|---|---|---|---|
| 0 | -0.4837 | -0.0656 | -0.0997 |
| 1 | -0.2569 | -0.0143 | -0.0217 |
| 2 | -0.1053 | 0.0000 | 0.0000 |
| 3 | -0.0229 | 0.0103 | 0.0103 |
| 4 | 0.0000 | 0.0474 | 0.0474 |
| 5 | 0.0103 | 0.1156 | 0.1156 |
| 6 | 0.0474 | 0.2176 | 0.2176 |
| 7 | 0.1156 | 0.3556 | 0.3556 |
| 8 | 0.2176 | 0.5310 | 0.5310 |
| 9 | 0.3556 | 0.7454 | 0.7454 |
| 10 | 0.5310 | 1.0000 | 1.0000 |
| 11 | 0.7454 | 1.0006 | 1.0117 |
| 12 | 1.0000 | 1.0011 | 1.0235 |
| 13 | 1.0953 | | |
| 14 | 0.1906 | | |
| 15 | 1.2859 | | |
| 16 | 1.3812 | | |

COLOR PROCESSING APPARATUS AND METHOD

BACKGROUND OF THE INVENTION

1. Field of the Invention

The present invention relates to a technology that is applied to generate a look-up table (LUT) for performing conversion processing on color data in an extended color space.

2. Description of the Related Art

A look up table is used to convert input color space data into output color space data. Normally, since the input color space has a great number of gradation levels, the LUT does not have the conversion values for all color data in the input color space, but prepares the conversion values for a plurality of representative grid points therein. For example, when the input color space has 'm' dimensions and n grid points are set for each channel, the LUT has the grid point data of the m-th power of n ($n^m$). For input color space data which is not at a grid point, an interpolation calculation is performed using data values of surrounding grid points to calculate output color space data corresponding to the input color space data.

In recent years, as a standard RGB color space, an scRGB (extended color space) is defined by extending a sRGB (base color space). In the scRGB color space, a range of color values for respective channels of red component (R), green component (G), and blue component (B) is extended from color values between 0.0 and 1.0 to color values between −0.5 and 7.5. Further, the number of bits for each channel is increased from 8 bits to 16 bits. With these extensions, the data in a sRGB color space (color values between 0.0 and 1.0) before performing the extension can be treated as it is.

A technology of a look up table applied to an extended color space is discussed in U.S. Pat. No. 7,034,844 and Japanese Patent Application Laid-Open No. 2006-093915.

When a look up table corresponding to an extended color space is generated using a method similar to a technology described in the above-described documents, the data size of the look up table is increased.

For example, when an sRGB color space (color values between 0.0 and 1.0) is extended to an scRGB color space (color values between −0.5 and 7.5) without changing the distance between grid points in the LUT, a range of an input value of the look up table needs to be increased up to eight times. When the look up table of the sRGB color space has 9 grid points, the scRGB color space has 65 grid points. When the look up table of the sRGB color space has 17 grid points, the scRGB color space has 129 grid points. When the look up table of the sRGB color space has 33 grid points, the scRGB color space has 257 grid points. Ratios of look up table sizes between the sRGB color space and the scRGB color space are respectively $65^3/9^3=376.7$ times, $129^3/17^3=436.9$ times, and $257^3/33^3=472.3$ times.

Even if the range of the scRGB color space is limited to the color values between −0.5 and 1.5, the ratios of the look up table sizes are respectively $17^3/9^3=6.7$ times, $33^3/17^3=7.3$ times, and $65^3/33^3=7.6$ times.

SUMMARY OF THE INVENTION

The present invention is directed to generate a look up table for converting a color data in an extended color space without substantially increasing the look up table size, while reducing deterioration of conversion accuracy.

According to an aspect of the present invention, a color processing apparatus includes an input range obtaining unit configured to obtain an input range of input color data represented by a first color space that is an extended color space, a setting unit configured to set grid point coordinate values for each of a plurality of color components included in the input color data, and a generating unit configured to generate a look-up table by performing conversion processing on each of look-up-table (LUT) coordinate values corresponding to grid point coordinate values set for the plurality of color components and storing a result of the conversion processing in the look-up table. The setting unit sets grid point coordinate values such that each of the primary colors in a second color space that is a base color space is located at a grid point, and the plurality of color components have identical grid point coordinate values among the primary colors.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Exemplary Embodiment

Figure 1:
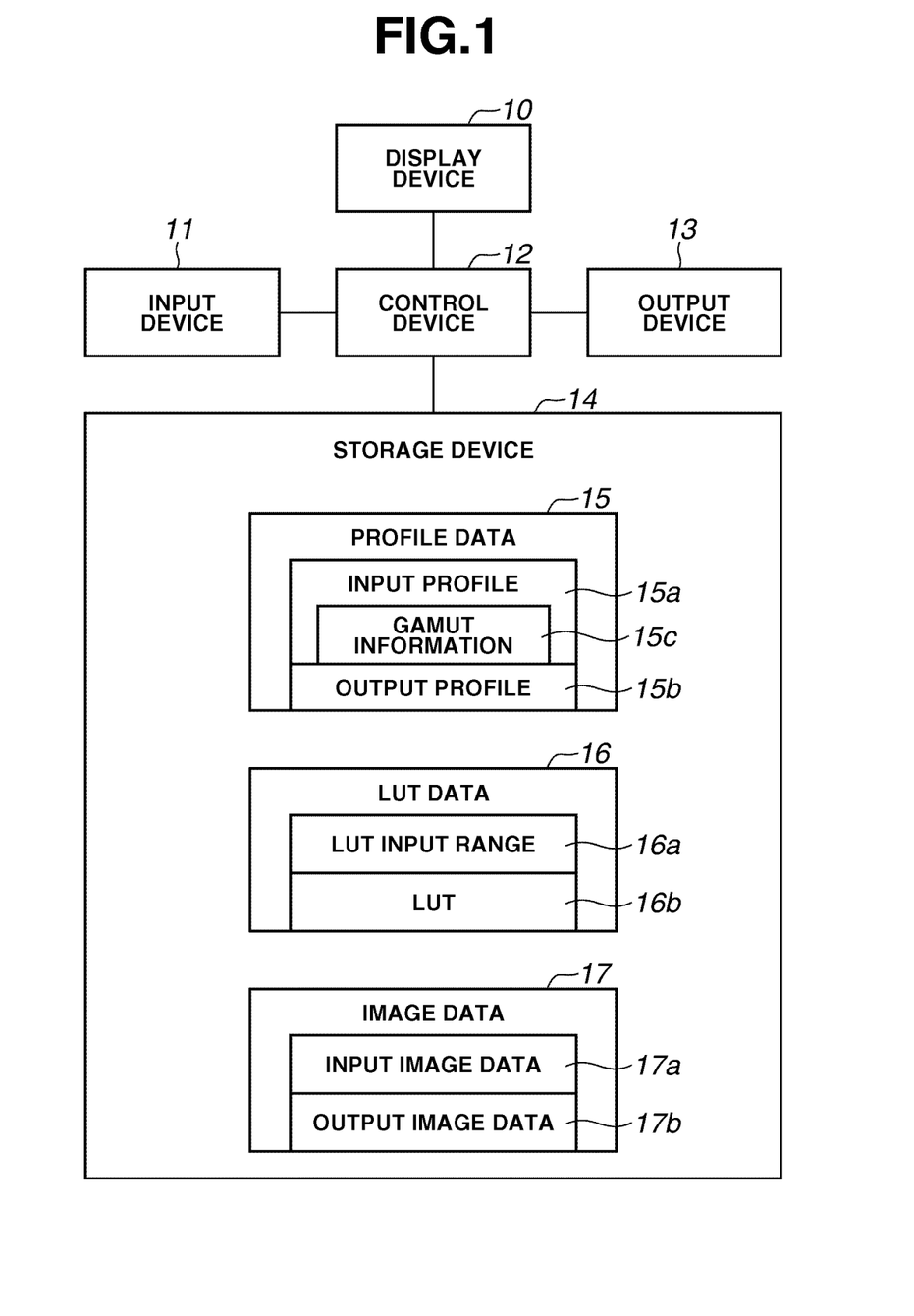
FIG. 1 is a block diagram illustrating a configuration of a color processing apparatus according to an exemplary embodiment of the present invention.

FIG. 1 is a block diagram illustrating a configuration of a color processing apparatus according to an exemplary embodiment of the present invention. The color processing apparatus performs color processing for converting input image data expressed in an extended color space such as an scRGB color space into output image data appropriate to an output apparatus.

The color processing apparatus includes a display device 10, an input device 11, a control device 12, an output device 13 and a storage device 14. The control device 12 (i.e., central processing unit (CPU)) and the storage device 14 (i.e., a memory) may be incorporated within one personal computer (PC). Alternatively, the storage device 14 may be an external storage medium of the PC. The control device 12 performs processing illustrated in FIGS. 2 to 4, and FIGS. 7 and 9 based on programs and various data (profile data, look up table data, and image data) stored in the storage device 14.

In the present exemplary embodiment, the control device 12, which is a computer, executes programs stored in the storage device 14 for performing processing illustrated in FIGS. 2 to 4, and FIGS. 7 and 9.

The storage device 14 stores profile data 15, look up table data 16, and image data 17. Further, the profile data 15 includes an input profile 15a, an output profile 15b, and gamut information 15c. The look up table data 16 includes a look up table input range 16a and a look up table 16b. The image data 17 includes input image data 17a and output image data 17b.

The input and output profiles 15a and 15b include information respectively representing input and output color characteristics.

In the present exemplary embodiment, the input profile 15a is a profile of an scRGB color space and stores gamut information, gamma information, and primary (RGB) color information.

The output profile 15b corresponds to devices such as the display device 10 and the output device 13. For example, the output profile 15b complies with the international color consortium (ICC) profile. The profile compliant with the ICC profile stores converting conditions between a device-dependent color space and a device-independent color space that is a profile connection space (PCS).

The look up table 16b is the look up table generated from the input profile 15a and the output profile 15b, and used to convert input color space data into output color space data.

Figure 2:
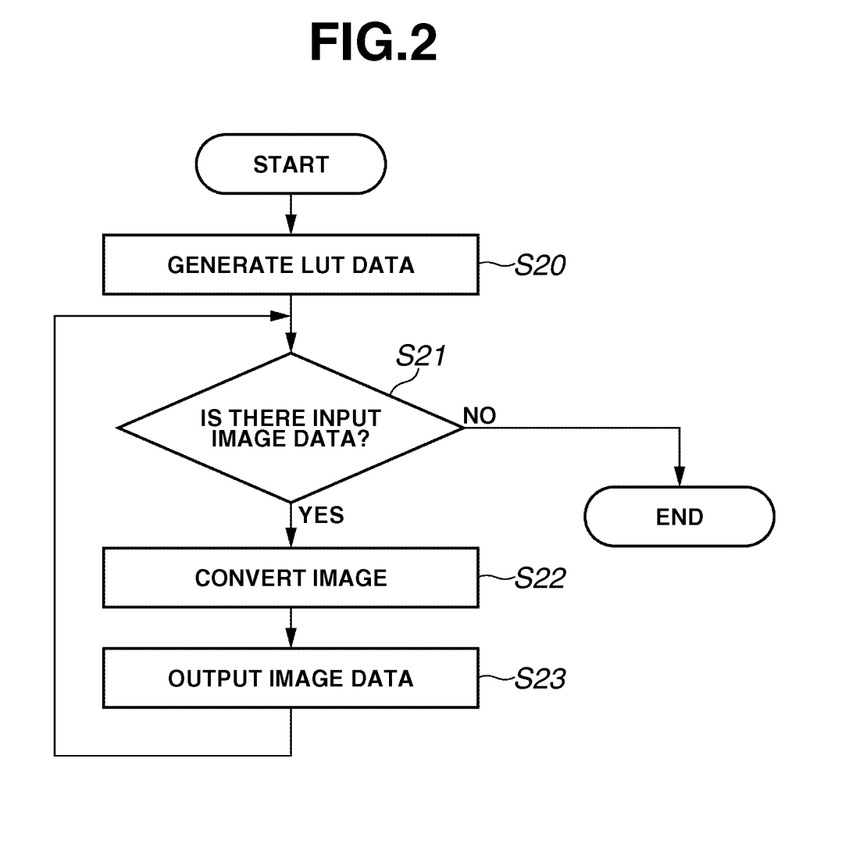
FIG. 2 is a flowchart illustrating a color processing procedure according to an exemplary embodiment of the present invention.

With reference to a flowchart in FIG. 2, a procedure of color processing (color matching) performed in the present embodiment will be described.

In the present embodiment, the color processing apparatus generates a look up table (LUT) for converting input color data expressed in the extended color space into output color data appropriate for an output device. Then, the input image data is converted into output image data using the generated look up table.

In step S20, the control device 12 generates the LUT data 16 from the input profile 15a and the output profile 15b. The details will be described later with reference to FIG. 3. In step S21, the control device 12 determines whether there is input image data 17a which is to be converted. If there is input image data 17a which is to be converted (YES in step S21), the processing proceeds to step S22. If there is no input image data (NO in step S21), the processing ends. In step S22, the control device 12 performs image conversion on the input image data 17a using the LUT data 16 to generate output image data 17b. The details will be described later with reference to FIG. 4. In step S23, the control device 12 outputs the output image data 17b to the output device 13, and then the processing returns to step S21.

Figure 3:
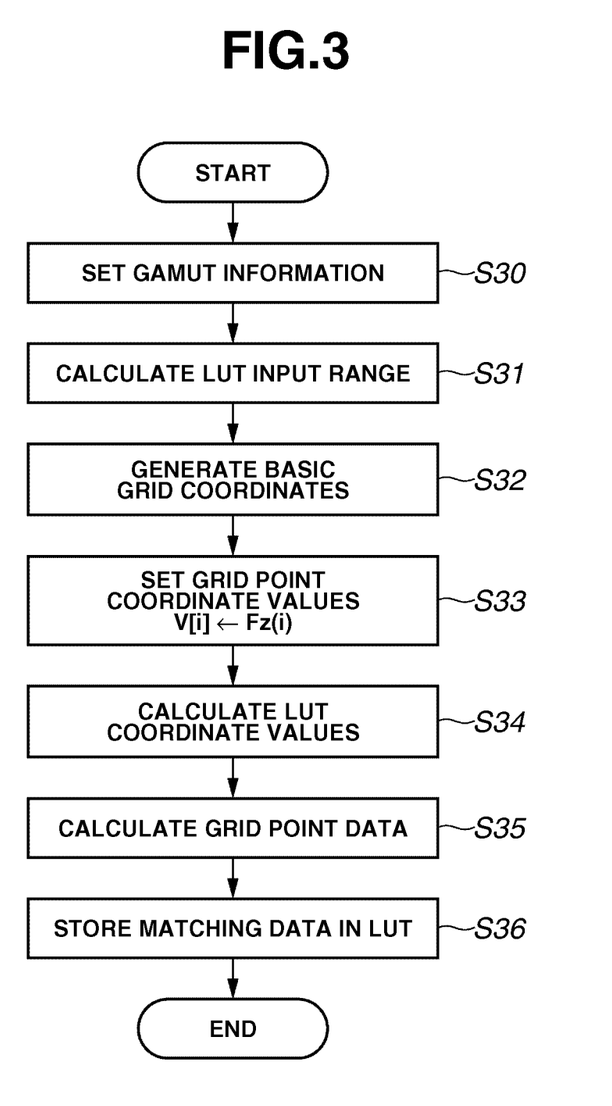
FIG. 3 is a flowchart illustrating a generating procedure of a look up table data according to an exemplary embodiment of the present invention.

With reference to a flowchart illustrated in FIG. 3, a procedure for generating look up table data in step S20 will be described.

In step S30, the control device 12 obtains the input profile 15a to acquire gamut information therefrom, which is set as gamut information 15c. In step S31, the control device 12 calculates a look up table input range from the gamut information 15c of the input profile 15a. For example, the control device 12 calculates the minimum value (min) and the maximum value (max) of the gamut for each of the RGB channels that are a plurality of color components included in the input color data, and sets the min and the max of the gamut to the LUT input range 16a. The values will be used for a function Fz in step S33.

In step S32, the control device 12 generates basic grid coordinates (index values) for each channel based on the number of grid points of the look up table. When the number of the grid points for each channel is defined as 'n', integer values from 0 to n−1 represent the basic grid coordinates. For example, when the number of channels is 3 and the number of the grid points for all channels is 9, with respect to each of the three channels, the integer values of 0, 1, 2, 3, 4, 5, 6, 7, and 8 represent the basic grid coordinates (index values).

In step S33, the control device 12 sets a grid point coordinate value of each basic grid coordinate for each channel, using the function Fz determined for each channel. The grid point coordinate values are coordinate values in the input color space, which is the scRGB color space according to the present exemplary embodiment. The details will be described later with reference to FIG. 7.

In step S34, the control device 12 acquires all combinations of the grid point coordinate values for each channel that are set in step S33 to calculate look up table coordinate values.

In step S35, the control device 12 performs color matching processing on each of all the look up table coordinate values acquired in step S34. More specifically, on each look up table coordinate value, conversion processing is performed according to color characteristics of the input profile 15a, and further conversion processing is performed using conversion conditions of the output profile 15b.

In step S36, the control device 12 stores a color matching result for all the look up table coordinate values acquired in step S35 in the look up table 16b as grid point data corresponding to each of the look up table coordinate values.

Figure 4:
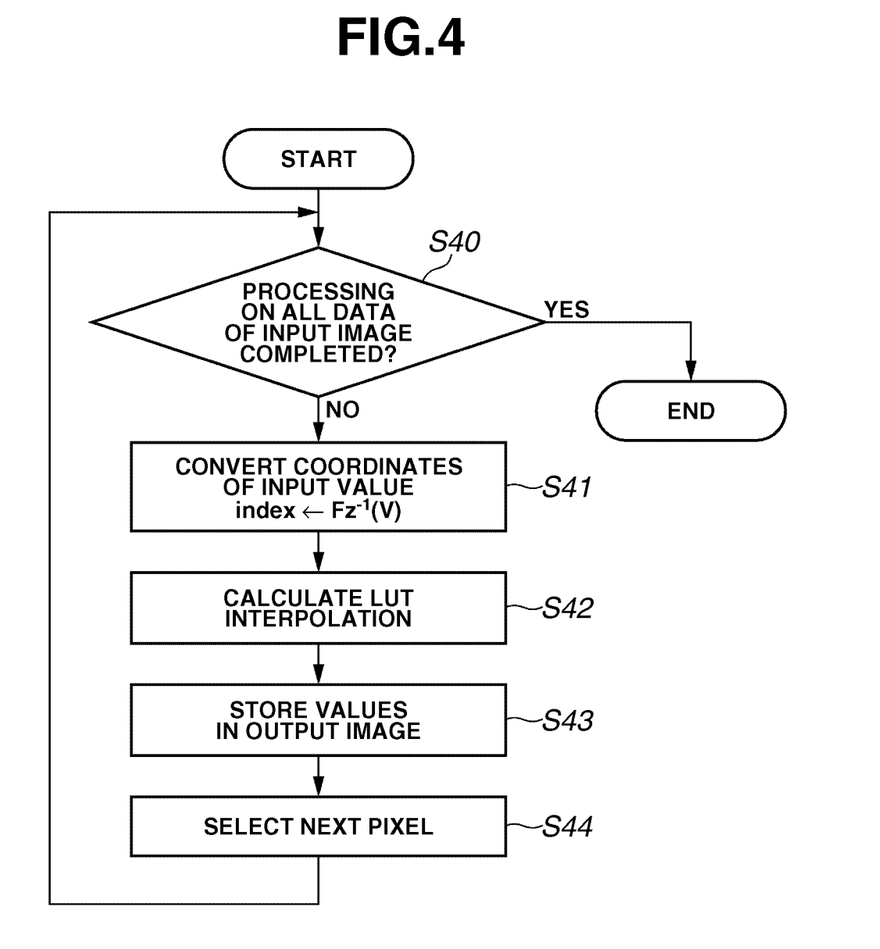
FIG. 4 is a flowchart illustrating an image conversion procedure according to an exemplary embodiment of the present invention.

With reference to the flowchart illustrated in FIG. 4, a procedure for converting an image according to the present exemplary embodiment performed in step S22 will be described.

In step S40, the control device 12 determines whether the image processing is completed on all input images. If the image processing is completed on all input images (YES in step S40), the processing ends. If not (NO in step S40), the processing proceeds to step S41.

In step S41, the control device 12 converts an input value to an index value (real number) using an inverse function $Fz^{-1}$ of the function Fz that is determined for each channel. The details will be described later with reference to FIG. 9.

In step S42, the control device 12 acquires an output value corresponding to the input value using interpolation calculation while referring to the LUT data 16 as an index using an index value for each channel acquired in step S41.

In the present exemplary embodiment, the control device 12 performs the interpolation calculation using a group of grid points data selected based on the index values. The group of the grid points data are data of grid points surrounding the input value whose coordinate is converted. However, in a case where the index value coordinate is on a diagonal line in a direction of a gray axis, the control device 12 performs the interpolation calculation from two grid data at both ends of the diagonal line in order to guarantee a color reproduction of gray.

In step S43, the control device 12 stores a result of interpolation calculation obtained in step S42 in a pixel position of the output image data 17b corresponding to a pixel position of the input image data 17a that is currently processed.

In step S44, the control device 12 selects a pixel that is to be subsequently processed, and the processing returns to step S40.

Figure 5:
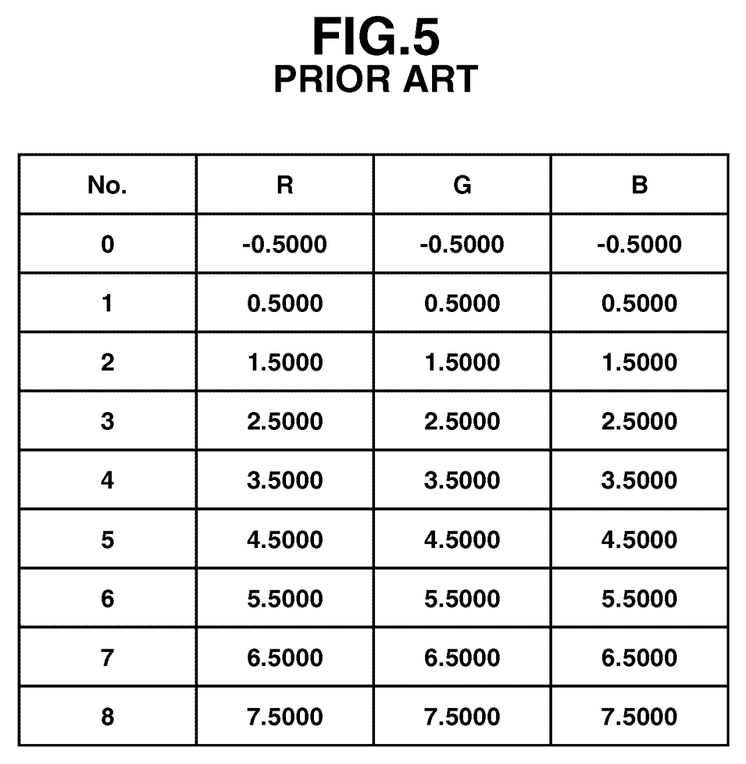
FIG. 5 is a table illustrating an example of conventional grid point coordinate values.

FIG. 5 is a table illustrating an example of grid point coordinate values generated by a conventional method. That is, the grid point coordinate values are generated with uniform 9 grid points for each channel over an entire range (color values between −0.5 and 7.5) in the scRGB color space. This method allocates grid points over the entire range in the scRGB color space.

That is, the grid points are also allocated to parts that are located outside the gamut of the actual input profile 15a and are not used for an input image. Thus, efficiency in using the look up table is decreased, and there arises a problem that accuracy of the result of interpolation calculation deteriorates due to a wide space between grid points.

Figure 6:
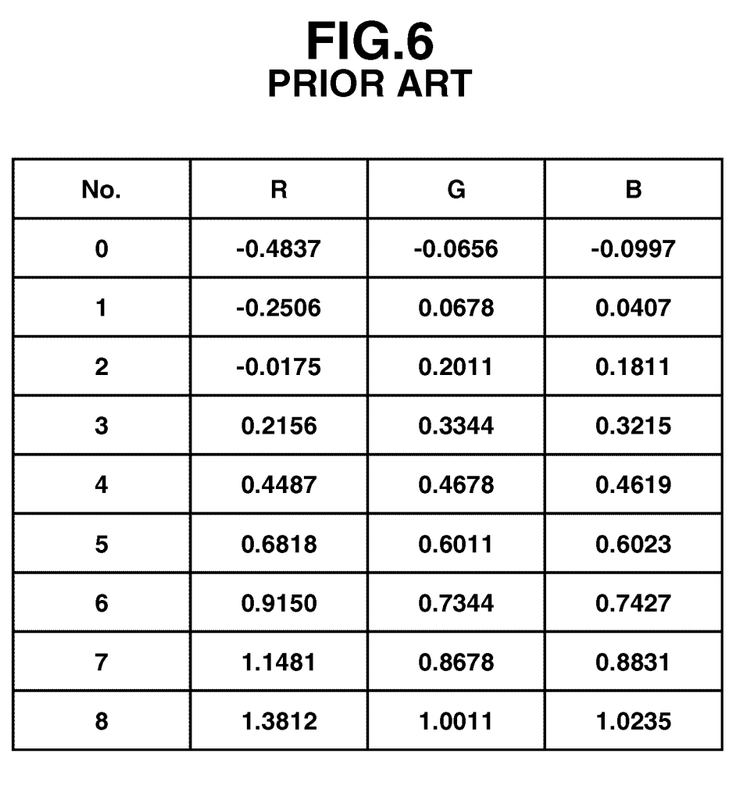
FIG. 6 is a table illustrating another example of conventional grid point coordinate values.

FIG. 6 is a table illustrating an example of grid point coordinate values obtained by a method that is improved from the conventional method. For each of the RGB channels, 9 grid points are allocated in a range between the minimum value and the maximum value of the gamut. With this allocation, compared to FIG. 5, the space between the grid points is shortened, so that accuracy of the interpolation calculation generally improves.

However, primary color values (a combination of 0.0 and 1.0) in the sRGB color space are not at the grid points. Consequently, the primary color value in the sRGB color space is acquired by interpolation calculation, so that accuracy of the primary color value deteriorates. Further, there is another problem because, since the RGB channels do not have identical grid point coordinate values, it may not be guaranteed that the interpolation calculation results in gray relative to a gray value (R=G=B).

Now, in the present exemplary embodiment, the above problems will be solved by acquiring the grid point coordinate values of the look up table (LUT) as follows.

(1) The LUT input range is limited using the minimum value and the maximum value for each of the RGB channels based on the gamut information of the input profile 15a, and the data of a part that is not used as an input value for actual color matching is not included in the LUT data.

(2) In the range of color values between 0.0 and 1.0, the RGB channels have identical grid point coordinate values and the interpolation calculation of gray is performed based on only coordinate values of gray.

In the present embodiment, the input profile 15a stores the gamut information. Therefore, as the gamut information in the input profile 15a, we can store information of the limited color gamut that has high possibility of being used as an input image rather than information showing the entire color gamut in the scRGB color space.

The color value of the scRGB color space is defined between −0.5 and 7.5. However, a color having a color value of −0.5 or 7.5 is seldom used in an actual image. Then, we can efficiently allocate the grid points by storing information showing a smaller gamut than that based on the definition in the scRGB color space as the gamut information.

With reference to the flowchart in FIG. 7, a procedure for acquiring grid point coordinate values according to the present exemplary embodiment will be described. Prior to performing the procedure illustrated in FIG. 7, the number of grid points 'n' and grid point indexes n0, n1 ($0 \leq n0 < n1 \leq n-1$) are defined for each color channel respectively. The value of n1−n0 is equal for each RGB channels, even if n0, n1 is different. In the range of grid point indexes between n0 and n1, all the channels have identical grid point coordinate values.

In the present exemplary embodiment, n0 represents a grid point index having an image coordinate value 0, and n1 represents a grid point index having an image coordinate value 1. Min($\leq 0$) represents the minimum value of LUT inputs, and max($\geq 1$) represents the maximum value of LUT inputs.

First, in step S70, the control device 12 substitutes 0 into the grid point index 'i'. If 'i' is smaller than 'n' (YES in step S71), the processing proceeds to step S72. If not (NO in step S71), the processing ends. If 'i' is smaller than n0 (YES in step S72), the processing proceeds to step S73. If not (NO in step S72), the processing proceeds to step S75.

In step S73, the control device 12 sets a result of multiplying the 2.2th power of (n0−i)/n0 by the min as the grid point coordinate value V[i] for the grid point index 'i'. In step S74, the control device 12 increases 'i' by 1, and the processing returns to step S71. If 'i' is n1 or smaller (YES in step S75), the processing proceeds to step S76. If not (NO in step S75), the processing proceeds to step S77.

In step S76, the control device 12 sets the 2.2th power of (i−n0)/(n1−n0) as the grid point coordinate value V[i] for the grid point index 'i', and the processing proceeds to step S74. In step S77, the control device 12 sets 1+(max−1)(i−n1)/(n−1−n1) as the grid point coordinate value V[i] for the grid point index 'i', and the processing proceeds to step S74.

The adjustment function Fz is constituted by the functions used in steps S73, S76 and S77. As shown by those expressions, the adjustment function Fz is based on the values of the min and max, n0, n1 set for each color channel. Therefore, the adjustment function Fz is set for each of the channels.

Figure 7:
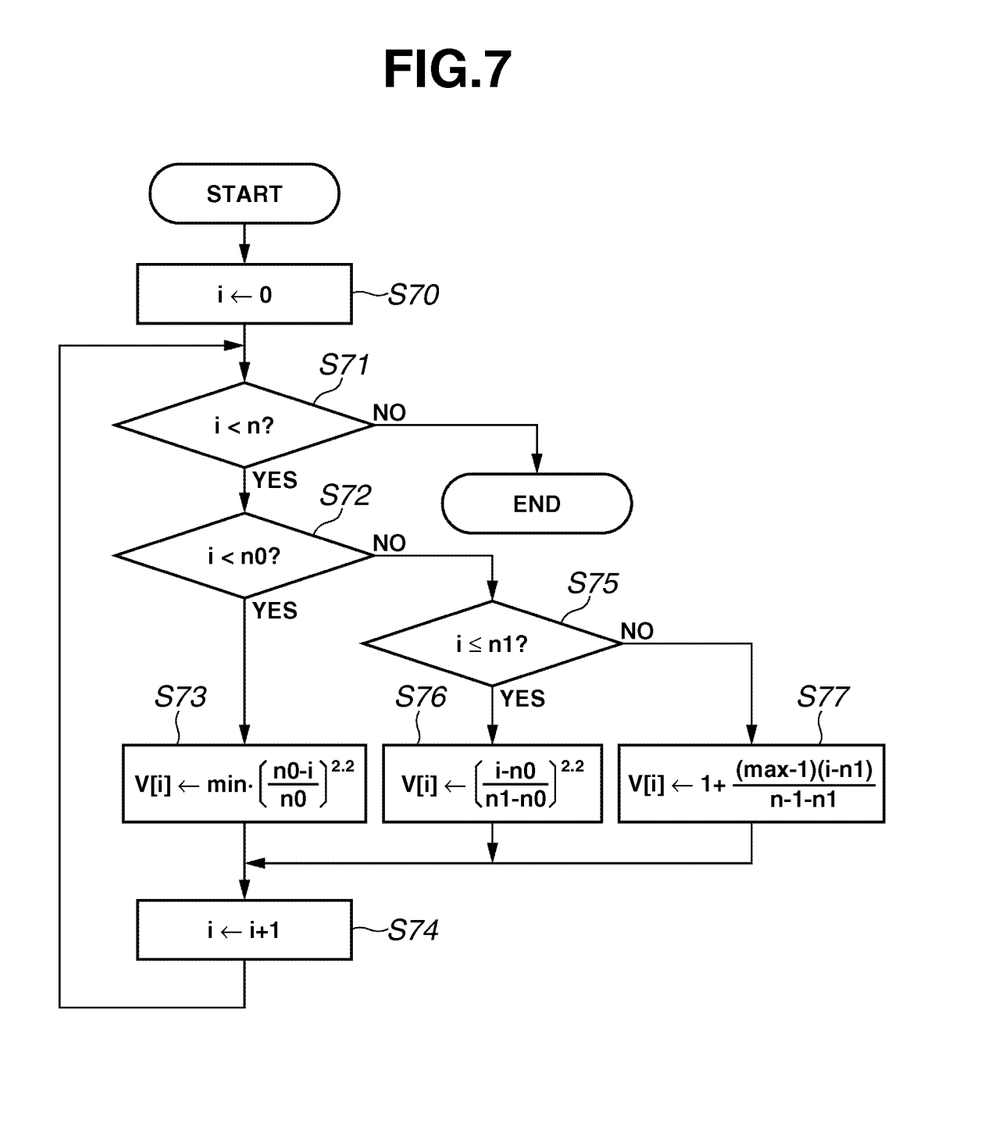
FIG. 7 is a flowchart illustrating a grid coordinate adjustment procedure according to an exemplary embodiment of the present invention.
Figure 8:
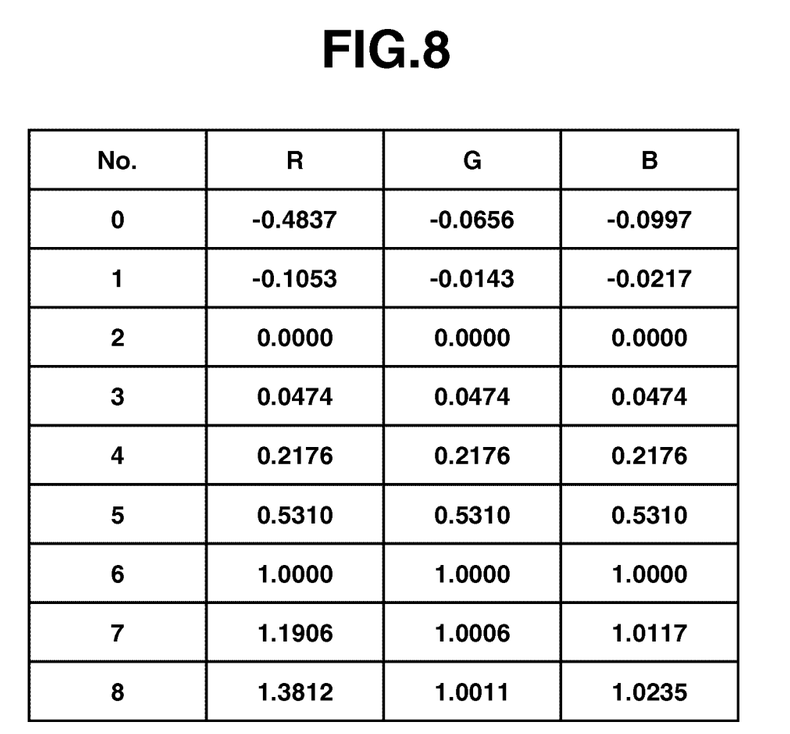
FIG. 8 is a table illustrating an example of grid point coordinate values.

FIG. 8 is a table illustrating an example of grid point coordinate values in the present exemplary embodiment. A value of the grid point index 0 is the gamut minimum(min) for each of the RGB channels, and a value of the grid point index 8 is the gamut maximum(max). The values in the table show the results of calculation where n=9, n0=2, n1=6 for all the channels, according to the procedures shown in FIG. 7.

According to the present exemplary embodiment, color values 0.0 and 1.0 are allocated at the grid points for all the RGB channels so that accuracy of the interpolation calculation for the primary color values in the sRGB color space is prevented from deteriorating in color matching with the LUT.

In other words, in the present exemplary embodiment, the LUT adapted for converting the color space of the scRGB (first color space) which is the extended color space of the sRGB (second color space) can be generated while preventing memory increase and color conversion accuracy deterioration compared to a look up table corresponding to the sRGB.

Further, since all the channels have identical grid point coordinate values between the color values 0.0 and 1.0, if a value of gray on a grid point is guaranteed to be gray, sRGB gray (color values between 0.0 and 1.0) on which interpolation calculation is to be performed is also guaranteed to be gray.

Furthermore, interpolation accuracy can improve within the SRGB range by using γ2.2, in a state where the distance between the grid points is narrow in a neighborhood of zero. This is caused by the sRGB having γ2.2.

With reference to the flowchart in FIG. 9, a procedure for performing input value coordinate conversion will be described. The input value coordinate conversion is performed using the inverse function $Fz^{-1}$ of the adjusting function Fz for each of the channels illustrated in FIG. 7. 'n', min, max, n0, and n1 are similar to those described in FIG. 7.

If a channel value V currently in processing is smaller than 0 (YES in step S90), the processing proceeds to step S91. If not (NO in step S90), the processing proceeds to step S92. In step S91, the control device 12 sets a value obtained by multiplying the (1/2.2)th power of (V/min) by n0 and subtracting the multiplied result from n0 as a grid point index value 'index' (real number).

If V is 1 or less (YES in step S92), the processing proceeds to step S93. If not (NO in step S92), the processing proceeds to step S94.

In step S93, the control device 12 sets a value obtained by multiplying the (1/2.2)th power of 'V' by (n1−n0) and adding n0 to the multiplied result as a grid point index value 'index' (real number). In step S94, the control device 12 sets n1+(V−1)(n−1−n1)/(max−1) as a grid point index value 'index' (real number).

Figure 9:
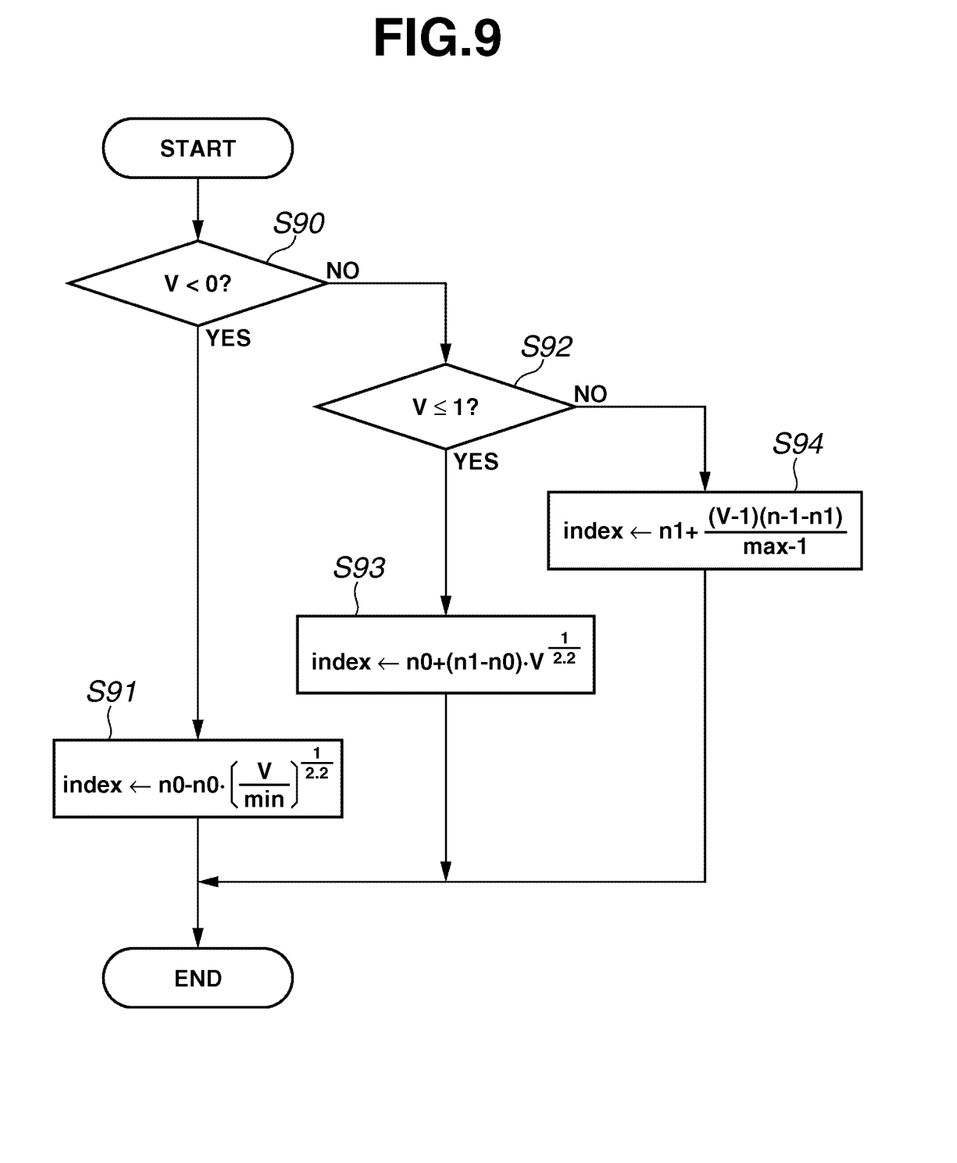
FIG. 9 is a flowchart illustrating an input color value coordinate conversion procedure according to an exemplary embodiment of the present invention.
Figure 10:
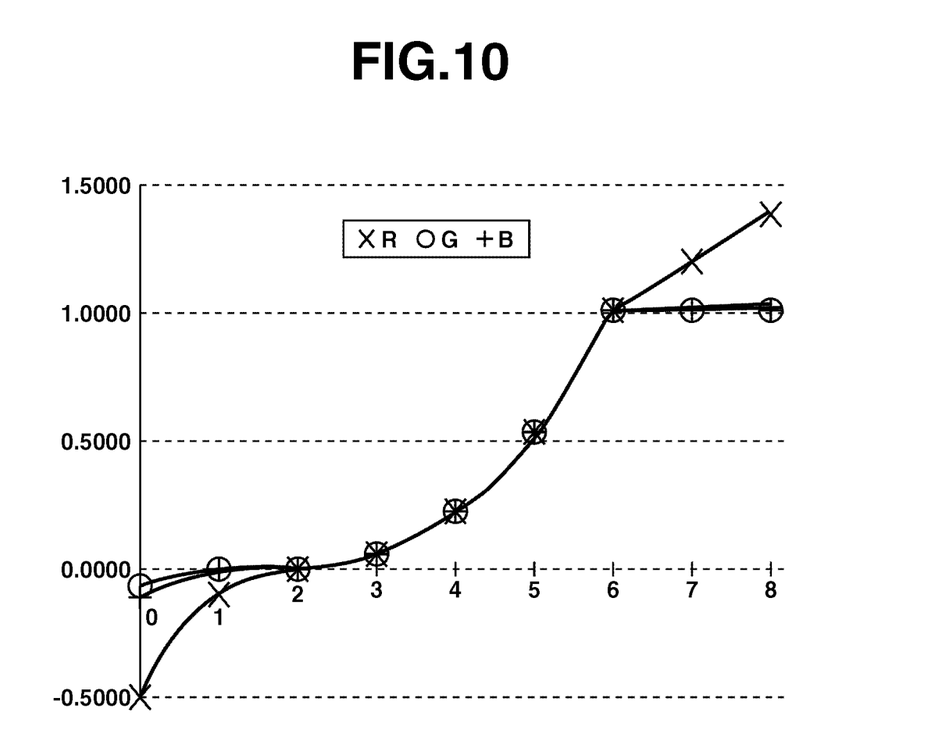
FIG. 10 is a graph illustrating an example of a coordinate converting function.

FIG. 10 is a graph illustrating an example of a coordinate converting function in the present embodiment, and illustrates Fz and inverse function $Fz^{-1}$ shown in FIGS. 7 and 9. A horizontal axis represents grid point indexes and a vertical axis represents color values for each channel.

Figure 11:
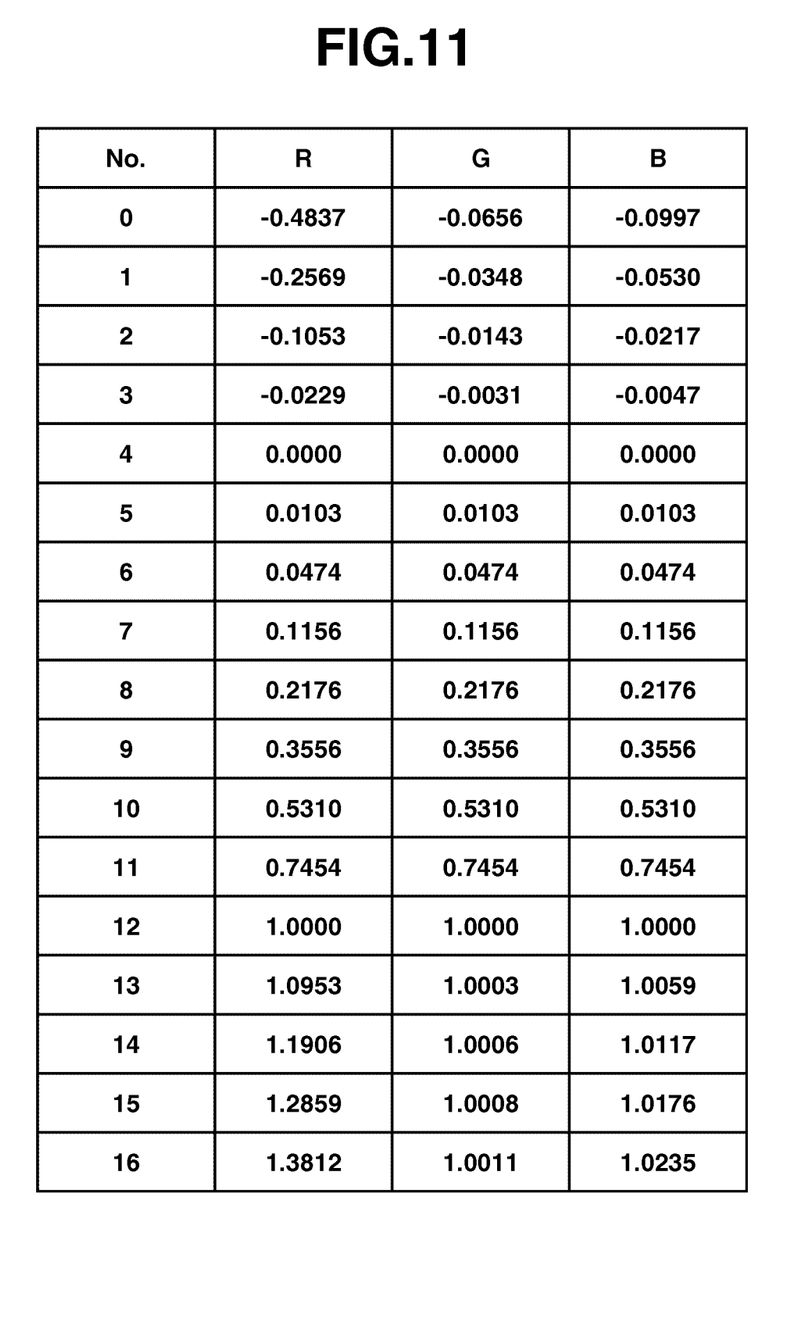
FIG. 11 is a table illustrating an example of grid point coordinate values.

FIG. 11 is a table illustrating another example of grid point coordinate values. The table of FIG. 11 differs from that of FIG. 8 in that n=17, n0=4, and n1=12. Regarding the grid point coordinate values in FIG. 11, the number of grid points is set to 17, thus the distances between the grid points are shorter compared to those in FIG. 8. Accordingly, accuracy of the interpolation calculation improves for the grid point coordinate values in FIG. 11.

Figure 12:
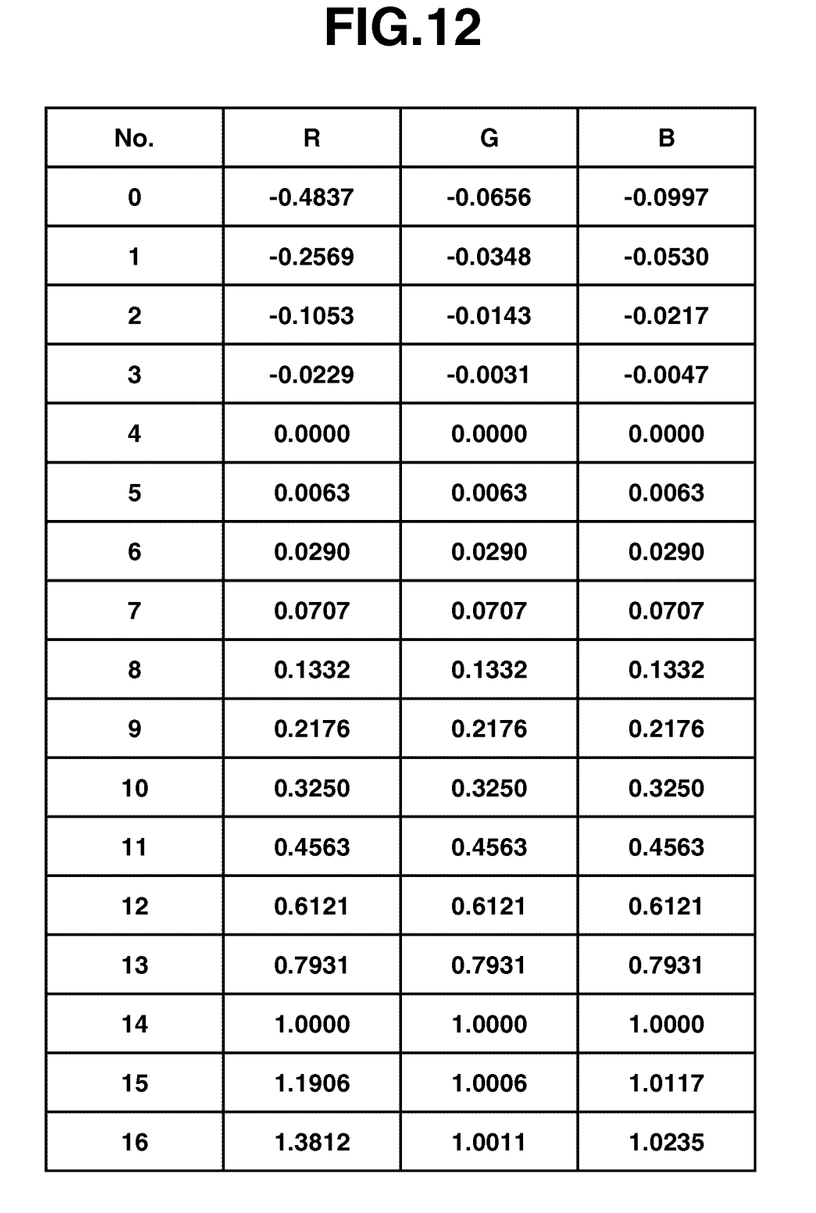
FIG. 12 is a table illustrating an example of grid point coordinate values.

FIG. 12 is a table illustrating another example of grid point coordinate values. The table of FIG. 12 differs from that of FIG. 11 in that n1=14. Regarding the grid point coordinate values in FIG. 12, the number of allocated grid points in the sRGB range (color values between 0.0 and 1.0) is increased compared to FIG. 11, so that accuracy of the interpolation calculation improves in the sRGB range.

Figure 13:
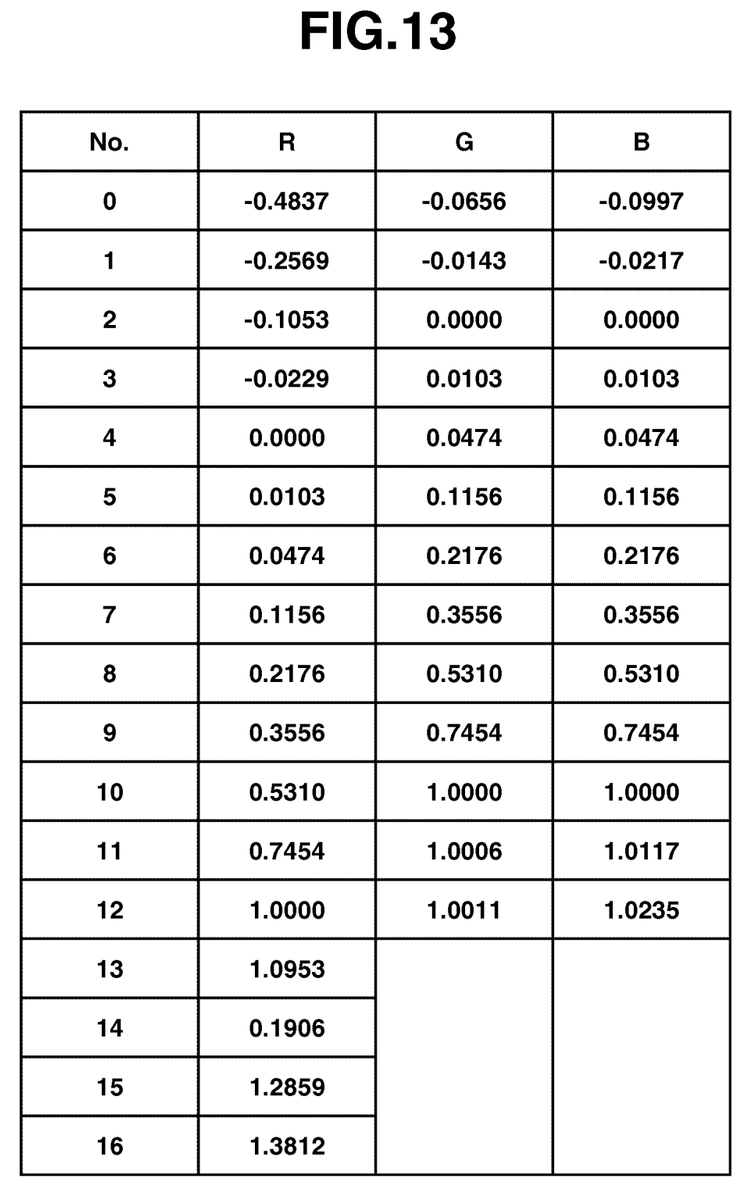
FIG. 13 is a table illustrating an example of grid point coordinate values.

FIG. 13 is a table illustrating another example of grid point coordinate values. The table of FIG. 13 differs from that of FIG. 11 in that n=12, n0=2, and n1=10 for the G, B channels. Regarding the grid point coordinate values in FIG. 13, the number of allocated grid points outside the sRGB range for the G, B channels is decreased compared to FIG. 11, so that the memory used can be reduced. Since values outside the sRGB range is narrower for the G, B channels than the R channel, accuracy does not significantly deteriorate even though the memory is reduced.

In the above embodiment, the gamut information is appended to the input profile. However, it is also possible to calculate the gamut information by analyzing the input profile.

It is also possible to use a profile that stores a correspondence relationship between a device value and a measurement value which represents characteristics of a device, as the input profile and the output profile. In this case, the converting conditions are generated from the correspondence relationship stored in the profile.

Further, in the present embodiment, the scRGB is used as the extended color space and the sRGB is used as the base color space. However, other color space may be used for the extended color space or the base color space.

Furthermore, in the present embodiment, as an example, the control device 12 realizes the above processing based on the programs. However, each of the above-described processing may also be implemented using devices instead of the programs.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-125244 filed May 10, 2007, which is hereby incorporated by reference herein in its entirety.

What is claimed is:

1. A color processing apparatus comprising:
    an input range obtaining unit configured to obtain an input range of input color data represented in an extended RGB color space, a range of the extended RGB color space being extended from a range of a base RGB color space;
    a setting unit configured to set grid point coordinate values for each of a plurality of color components in the extended RGB color space based on the input range of the input color data; and
    a generating unit configured to generate a look-up table by performing conversion processing on each look-up table coordinate value which is a combination of a grid point coordinate value set for the plurality of color components, and to store a result of the conversion processing in the look-up table for a target device,
    wherein the setting unit sets the grid point coordinate value such that each of primary colors having a value of 0 or 1 of the base RGB color space is located at a grid point, and the plurality of color components have identical grid point coordinate values between the primary colors, and
    wherein the setting unit sets the grid point coordinate value that is determined independently from the target device.

2. The color processing apparatus according to claim 1, wherein a first color space and a second color space each include a red component, a green component, and a blue component.

3. The color processing apparatus according to claim 1, wherein the input range of a color data represented by a first color space includes negative values and a range greater than 1, and
    wherein color data represented by the first color space has a value of 0 or 1.

4. The color processing apparatus according to claim 1, wherein the input range obtaining unit is configured to obtain an input range for each of the plurality of color components included in the input color data.

5. The color processing apparatus according to claim 1, further comprising an input unit configured to input an input profile and an output profile,
    wherein the input range obtaining unit is configured to obtain an input range stored in the input profile, and
    wherein the generating unit is operable to perform the conversion processing using the input profile and the output profile.

6. A color processing apparatus according to claim 1, wherein the range of the extended color space is extended from the range of the base color space without changing a value in the range of the base color space.

7. A color processing method comprising:
  obtaining an input range of input color data represented in an extended RGB color space, a range of the extended RBG color space being extended from a range of a base RGB color space;
  setting grid point coordinate values for each of a plurality of color components in the extended RGB color space based on the input range of the input color data; and
  generating a look-up table by performing conversion processing on each look-up-table coordinate value which is a combination of a grid point coordinate value set for the plurality of color components, and storing a result of the conversion processing in the look-up table for a target device,
  wherein the grid point coordinate values are set such that each of primary colors having a value of 0 or 1 of the base RGB color space is located at a grid point, and the plurality of color components have identical grid point coordinate values between the primary colors, and
  wherein the setting unit sets the grid point coordinate value that is determined independently from the target device.

8. A non-transitory computer-readable medium having stored thereon computer-executable instructions that realize the color processing method according to claim 7 using a computer.

9. A color processing apparatus comprising:
  an input range obtaining unit configured to obtain an input range of input color data represented in an extended RGB color space, a range of the extended RGB color space being extended from a range of a base RGB color space defined between a plurality of primary colors, the extended RGB color space being defined both within the range of the base RGB color space and outside the range of the base RGB color space;
  a setting unit configured to set grid point coordinate values for each of a plurality of color components in the extended RGB color space based on the input range of the input color data; and
  a generating unit configured to generate a look-up table by performing conversion processing on each look-up table coordinate value which is a combination of a grid point coordinate value set for the plurality of color components, and to store a result of the conversion processing in the look-up table for a target device,
  wherein the setting unit sets the grid point coordinate value such that each of primary colors having a value of 0 or 1 of the base RGB color space is located at a grid point of the extended color space, and the plurality of color components have identical grid point coordinate values between the primary colors, and
  wherein the setting unit sets the grid point coordinate value that is determined independently from the target device.

10. A color processing method comprising:
  obtaining an input range of input color data represented in an extended RGB color space, a range of the extended color space being extended from a range of a base RGB color space defined between a plurality of primary colors, the extended RGB color space being defined both within the range of the base RGB color space and outside the range of the base RGB color space;
  setting grid point coordinate values for each of a plurality of color components in the extended RGB color space based on the input range of the input color data; and
  generating a look-up table by performing conversion processing on each look-up-table coordinate value which is a combination of a grid point coordinate value set for the plurality of color components, and storing a result of the conversion processing in the look-up table for a target device
  wherein the grid point coordinate values are set such that each of primary colors having a value of 0 or 1 of the base RGB color space is located at a grid point of the extended color space, and the plurality of color components have identical grid point coordinate values between the primary colors, and
  wherein the setting unit sets the grid point coordinate value that is determined independently from the target device.

11. A non-transitory computer-readable medium having stored thereon computer-executable instructions that realize the color processing method according to claim 10 using a computer.

\* \* \* \* \*